US012509569B2

(12) United States Patent
Suzuki et al.

(10) Patent No.: US 12,509,569 B2
(45) Date of Patent: Dec. 30, 2025

(54) CURABLE FLUOROPOLYMER COMPOSITIONS COMPRISING METAL FLUORIDE PARTICLES AND ARTICLES THEREFROM

(71) Applicant: 3M INNOVATIVE PROPERTIES COMPANY, St. Paul, MN (US)

(72) Inventors: Yuta Suzuki, Kanagawa (JP); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 892 days.

(21) Appl. No.: 17/626,226

(22) PCT Filed: Aug. 24, 2020

(86) PCT No.: PCT/IB2020/057896
§ 371 (c)(1),
(2) Date: Jan. 11, 2022

(87) PCT Pub. No.: WO2021/038424
PCT Pub. Date: Mar. 4, 2021

(65) Prior Publication Data
US 2022/0315732 A1 Oct. 6, 2022

Related U.S. Application Data

(60) Provisional application No. 62/892,035, filed on Aug. 27, 2019.

(51) Int. Cl.
*C08K 3/11* (2018.01)
*C08K 3/105* (2018.01)
*C08K 3/16* (2006.01)

(52) U.S. Cl.
CPC ............... *C08K 3/11* (2018.01); *C08K 3/105* (2018.01); *C08K 2003/164* (2013.01); *C08K 2003/166* (2013.01)

(58) Field of Classification Search
CPC .... C08K 3/11; C08K 3/105; C08K 2003/164; C08K 2003/166; C08K 2003/162; C08K 2201/003; C08K 3/16; C08L 27/12
See application file for complete search history.

(56) References Cited

U.S. PATENT DOCUMENTS

| | | | |
|---|---|---|---|
| 3,876,654 A | 4/1975 | Pattison | |
| 4,233,421 A | 11/1980 | Worm | |
| 4,394,489 A | 7/1983 | Aufdermarsh | |
| 4,525,539 A | 6/1985 | Feiring | |
| 4,912,171 A | 3/1990 | Grootaert | |
| 4,983,680 A | 1/1991 | Ojakaar | |
| 5,086,123 A | 2/1992 | Guenthner | |
| 5,225,504 A | 7/1993 | Tatsu | |
| 5,262,490 A | 11/1993 | Kolb | |
| 5,591,804 A | 1/1997 | Coggio | |
| 5,824,749 A | 10/1998 | Sonoi | |
| 5,929,169 A | 7/1999 | Jing | |
| 6,191,233 B1 | 2/2001 | Kishine | |
| 6,946,513 B2 | 9/2005 | Higashino | |
| 9,309,370 B2 | 4/2016 | Shefelbine | |
| 10,557,031 B2 | 2/2020 | Aoki et al. | |
| 10,927,235 B2 | 2/2021 | Fukushi et al. | |
| 2003/0180503 A1 | 9/2003 | Yamato | |
| 2005/0020748 A1 | 1/2005 | Morikawa | |
| 2006/0293432 A1 | 12/2006 | Hirano | |
| 2007/0100062 A1 | 5/2007 | Lyons et al. | |
| 2010/0248190 A1* | 9/2010 | Chen ........................ A61K 6/90 433/215 |

FOREIGN PATENT DOCUMENTS

| | | |
|---|---|---|
| CN | 106566142 | 4/2017 |
| CN | 109535613 A | 3/2019 |
| EP | 3674365 | 7/2020 |
| JP | 2002256204 | 9/2002 |
| JP | 2003055577 | 2/2003 |
| JP | 2008-007680 A | 1/2008 |
| JP | 2008001872 | 1/2008 |
| JP | 2008273199 | 11/2008 |
| JP | 2009513795 A | 4/2009 |
| JP | 2010037558 | 2/2010 |
| JP | 2011021187 | 2/2011 |
| JP | 2013068748 | 4/2013 |
| JP | 2018-522113 A | 8/2018 |
| TW | 201731881 A | 9/2017 |
| WO | WO 2001-016234 | 3/2001 |
| WO | WO 2001-079337 | 10/2001 |
| WO | WO 2001-085848 | 11/2001 |
| WO | WO 2002-031006 | 4/2002 |
| WO | WO 2002-102892 | 12/2002 |
| WO | WO 2004-063281 | 7/2004 |
| WO | WO 2004-094527 | 11/2004 |
| WO | WO 2006-088076 | 8/2006 |
| WO | WO 2008-130557 | 10/2008 |
| WO | WO 2008-133004 | 11/2008 |
| WO | WO 2009-031610 | 3/2009 |
| WO | WO 2010-047234 | 4/2010 |
| WO | WO 2010-071758 | 6/2010 |
| WO | WO 2010-076876 | 7/2010 |
| WO | WO 2011-125614 | 10/2011 |
| WO | WO 2012-040250 | 3/2012 |

(Continued)

OTHER PUBLICATIONS

Database WPI Week 201935 Thomson Scientific, London, GB; AN 2019-37038B, 2017, pp. 1-2, XP002800427.
Weast, "Physical Constants of Inorganic Compounds", CRC Handbook of Chemistry and Physics, The Chemical Rubber Company, 1966, 47th Edition, pp. B-149-B-252.
International Search Report for PCT International Application No. PCT/IB2020/057896, mailed on Oct. 2, 2020, 5 pages.

*Primary Examiner* — Doris L Lee
(74) *Attorney, Agent, or Firm* — Julie Lapos-Kuchar

(57) ABSTRACT

Described herein is a curable fluoropolymer composition comprising: an amorphous fluoropolymer; and particles of a metal fluoride, wherein the particles are not substantially surface treated and wherein the metal of the metal fluoride comprises at least one of an alkaline earth metal, a Group III transition metals, and a Lanthanide metals. Also described are cured articles made with the curable fluoropolymer composition.

20 Claims, No Drawings

(56) References Cited

FOREIGN PATENT DOCUMENTS

| WO | WO-2012106172 A2 * | 8/2012 | ............ C08F 14/18 |
|----|----|----|----|
| WO | WO 2015-112751 | 7/2015 | |
| WO | WO 2016-043100 | 3/2016 | |
| WO | WO 2016-133108 | 8/2016 | |
| WO | WO 2016-195900 | 12/2016 | |
| WO | WO 2017-162656 | 9/2017 | |
| WO | WO 2018-030427 | 2/2018 | |
| WO | WO 2018-105716 | 6/2018 | |
| WO | WO 2019-078238 | 4/2019 | |

* cited by examiner

CURABLE FLUOROPOLYMER COMPOSITIONS COMPRISING METAL FLUORIDE PARTICLES AND ARTICLES THEREFROM

TECHNICAL FIELD

A curable composition comprising an amorphous fluoropolymer and particles of metal fluoride is described as well as cured articles thereof.

SUMMARY

There is a desire to identify a fluorinated elastomer which has good chemical performance properties as well as improved performance in plasma etching.

In one aspect, a curable fluoropolymer composition is described comprising: an amorphous fluoropolymer; and particles of a metal fluoride, wherein the metal of the metal fluoride comprises at least one of an alkaline earth metal, a Group III transition metal particles, and a Lanthanide.

In another aspect, a cured article is described comprising: a fluoroelastomer; and particles of a metal fluoride, wherein the particles are not substantially surface treated and wherein the metal of the metal fluoride comprises at least one of an alkaline earth metal, a Group III transition metal particles, and a Lanthanide.

In another aspect, a method of making an article is described comprising: providing a curable fluoropolymer composition comprising: an amorphous fluoropolymer; and particles of a metal fluoride, wherein the particles are not substantially surface treated and wherein the metal of the metal fluoride comprises at least one of an alkaline earth metal, a Group III transition metal particles, and a Lanthanide; and then curing the curable composition.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"latex" as used herein refers to a dispersion of polymer particles in an aqueous continuous phase;

"monomer" is a molecule which can undergo polymerization which then form part of the essential structure of a polymer;

"organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate;

"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and "polymer" refers to a macrostructure having a number average molecular weight (Mn) of at least 30,000 dalton, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure relates to amorphous fluoropolymer compositions comprising metal fluoride particles. These amorphous fluoropolymer compositions may then be subsequently cured to form fluoroelastomer articles.

The metal fluoride particles of the present disclosure comprise a metal, wherein the metal is an alkaline earth metal (i.e., Be, Mg, Ca, Sr, Ba, and Ra), a Group III transition metal (i.e., Sc and Y), and/or a Lanthanide series metal (i.e., those having atomic numbers 57-71). In one embodiment, the metal is an alkaline earth metal. In one embodiment, the metal is a Group III transition metal. In yet another embodiment, the metal is a Lanthanide series metal. Exemplary metal fluorides include: calcium fluoride, magnesium fluoride, yttrium fluoride, and ytterbium fluoride. In one embodiment, the metal fluoride is not water soluble, meaning that the metal fluoride has a solubility in water at ambient pressure (such a 1 atm) and 25° C. of less than 0.50, 0.40, 0.30, 0.20, 0.10, 0.05, or even 0.01 g per 100 g of water. For example, the solubility of LiF is 0.13 g/100 mL at 25° C.; $ZrF_4$ is 1.388 g/100 mL at 25° C.; and $AlF_3$ is 0.559 g/100 mL at 25° C. which can be found in reference books such as CRC Handbook of Chemistry and Physics, 47$^{th}$ Edition, Weast, Robert C., Ed., pages B-149 to B-252, The Chemical Rubber Company, Cleveland: 1966 and The Merck Index, 9$^{th}$ ed., Merck & Co., Rahway, N J, 1976, pages 47 and 722.

The metal fluoride particles of the present disclosure are not particularly limited in shape. In one embodiment, the metal fluoride particles are spherical or ellipsoidal in nature, meaning that the particles when magnified into a two-dimensional image appear generally rounded and free of sharp corners or edges The particle size of the metal fluoride particles can be determined based on techniques known in the art, for example, microscopy, electrical impedance, or light scattering techniques.

In one embodiment, the particles are micron-sized in nature, wherein the particles have an average diameter of at least 750 nm, 1 micron, 2, microns, 5 microns, 10 microns, or even 20 microns; and less than 50, 100, 150, 200, 250, 300, 400, 500, 600, 800, 900, or even 1000 microns.

In one embodiment, the particles have an average diameter of less than 500, 400, 300, 200, or even 100 nm.

In one embodiment, the particles are nano-sized in nature, having an average diameter of at least 3 nm, 5 nm, 8 nm, 10 nm, 15 nm or even 20 nm; and at most about 25, 30, 50 or even 100 nm.

In one embodiment, the metal fluoride particles are essentially pure, comprising a single metal fluoride, however, the particles may contain small amounts (e.g., less than 20, 10, 5, 1, 0.5, 0.3, or even 0.2 wt %) of other metals such as copper or phosphorous.

In one embodiment, the particles comprise a combination of metal fluorides such as a combination of ytterbium fluoride and magnesium fluoride.

The metal fluoride particles of the present disclosure are not surface treated with an organic moiety, meaning that the surface of the particles comprises little to no organic compound bound (via ionic bonding, hydrogen bonding, Van der waal forces, or covalently bound, etc.) to the particle. Frequently, metal-containing particles used in plasma applications are surface treated to improve their performance. A silylation agent, silicone oil or a silane coupling agent are some treatments used to modify the particles' surface. Examples of the silylation agent are, for instance, trimethylchlorosilane, dimethyldichlorosilane, hexamethyldisilazane, N,O-bis(trimethylsilyl)acetamide, N-trimethylsilylacetamide, N,N'-bis(trimethylsilyl)urea, N-trimethylsilyldiethylamine, N-trimethylsilylimidazole, t-butyldimethylchlorosilane and the like. Examples of silicone oil include dimethylsilicone oil. Examples of a silane coupling agent include, for instance, vinyltrichlorosilane, vinyltris(β-methoxyethoxy)silane, vinyltriethoxysilane, vinyltrimethoxysilane, γ-(methacryloyloxypropyl)trimethoxysilane, β-(3,4-epoxycyclohexyl)ethyltrimethoxysilane, γ-glycidyloxypropyltrimethoxysilane, γ-glycidyloxypropylmethyldiethoxysilane, N-β-(aminoethyl)-γ-aminopropyltrimethoxysilane, N-β-(aminoethyl)-γ-aminopropylmethyldiethoxysilane, γ-aminopropyltriethoxysilane, N-phenyl-γ-aminopropyltrimethoxysilane, γ-mercaptopropyltrimethoxysilane, γ-chloropropyltrimethoxysilane and the like. In the present disclosure, it has been discovered that the metal fluoride particles which are not substantially surface treated can perform well under plasma etching conditions. In one embodiment, the weight of organic moieties on the surface of the metal fluoride particle as compared to the weight of the metal fluoride particle is less than 20, 10, 5, 1, 0.5, 0.1, 0.05, or even 0.01%; or even no detectable organic moieties on the surface.

The metal fluoride particles in the curable composition are used in an amount of at least 0.1, 0.5, 1, 2, 4, 5, 8, 10, or even 12 wt %; and at most 10, 15, 20, 25, or even 30 wt % when compared to the weight of the curable composition.

The present disclosure provides the metal fluoride particles with an amorphous fluoropolymer. As used herein, an amorphous fluoropolymer refers to a polymer that has no detectable crystalline character by DSC (differential scanning calorimetry). If studied under DSC, the amorphous fluoropolymer would have no melting point or melt transitions with an enthalpy more than 2 milliJoules/g by DSC.

The amorphous fluoropolymer of the present disclosure is highly fluorinated, meaning that at least 60%, 70%, 75%, 90%, 95% or even 99% of the carbon-hydrogen bonds of the amorphous fluoropolymer are replaced by carbon-fluorine bonds. In one embodiment, the amorphous fluoropolymer is perfluorinated, in other words, the polymer, excluding the sites where polymerization is initiated or terminated, comprise no C—H bonds, and comprises C—F bonds.

The amorphous fluoropolymer of the present disclosure is derived from at least one fluorinated monomer. Exemplary fluorinated monomers include: tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), (per)fluorovinyl ethers (including perfluoroalkyl vinyl ethers and perfluoroalkoxy vinyl ethers), (per)fluoroallyl ethers (including perfluoroalkyl allyl ethers and perfluoroalkoxy allyl ethers), perfluoroalkyl vinyl monomers, fluorinated alkoxides (such as hexafluoropropylene oxide), fluorinated styrenes, fluorinated siloxanes, and combinations thereof.

Suitable (per)fluoroalkyl vinyl ether monomers correspond to the general formula: $CF_2=CF-O-Rf^5$ or $CH_2=CH-O-Rf^5$ wherein $Rf^5$ represents a perfluoroalkyl group of 1-10, or even 1-5 carbon atoms. Examples of perfluoroalkoxy vinyl ethers include those that correspond to the formula: $CF_2=CF-O-Rf^6$ wherein $Rf^6$ represents a perfluorinated aliphatic group that contains one or more oxygen atoms and up to 12, 10, 8, 6 or even 4 carbon atoms. Specific examples of (per)fluorovinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable (per)fluoroalkyl allyl ether monomers correspond to the general formula: $CF_2=CF-CF_2-O-Rf^5$ or $CH_2=CH-CF_2-O-Rf^5$ wherein $Rf^5$ represents a perfluoroalkyl group of 1-10, or even 1-5 carbon atoms. Examples of perfluoroalkoxy allyl ethers include those that correspond to the formula: $CF_2=CF(CF_2)-O-Rf^7$ wherein $Rf^7$ represents a perfluorinated aliphatic group that contains one or more oxygen atoms and up to 10, 8, 6 or even 4 carbon atoms. Specific examples of (per)fluoroallyl ethers include: $CF_2=CF_2-CF_2-O-(CF_2)_nF$ wherein n is an integer from 1 to 5, and $CF_2=CF_2-CF_2-O-(CF_2)_n-O-(CF_2)_y-F$ wherein x is an integer from 2 to 5 and y is an integer from 1 to 5.

Additionally, cure-site monomers as are known in the art may be added during the polymerization, so that the amorphous fluoropolymer comprises iodine-, bromine- and/or nitrogen-containing cure site groups, which may be subsequently used to cross-link the amorphous fluoropolymer composite.

In one embodiment, iodine- and bromine-cure site groups may be derived from monomers of the formula: $CX_2=CX(Z)$, wherein: (i) X each is independently H or F; and (ii) Z is I, Br, $R_f-U$ wherein U=I or Br and $R_f$=a perfluorinated or partially perfluorinated alkylene group optionally containing O atoms. In addition, non-fluorinated bromo- or iodo-olefins, e.g., vinyl iodide and allyl iodide, can be used. Exemplary iodine- and bromine-cure site groups may be derived from: $CH_2=CHI$, $CF_2=CHI$, $CF_2=CFI$, $CH_2=CHCH_2I$, $CF_2=CFCF_2I$, $CH_2=CHCF_2CF_2I$, $CH_2=CHCF_2CF_2CH_2CH_2I$, $CH_2=CH(CF_2)_4I$, $CH_2=CH(CF_2)_4CH_2CH_2I$, $CH_2=CH(CF_2)_{61}$, $CH_2=CH(CF_2)_6CH_2CH_2I$, $CF_2=CFCH_2CH_2I$, $CF_2=CFCF_2CF_2I$, $CF_2=CFOCF_2CF_2I$, $CF_2=CFOCF_2CF_2CH_2CH_2I$, $CF_2=CFOCF_2CF_2CF_2I$, $CF_2=CFOCF_2CF_2CF_2CH_2CH_2I$, $CF_2=CFOCF_2CF_2CH_2I$, $CF_2=CFOCF_2CF_2CF_2CH_2I$, $CF_2=CFCF_2OCH_2CH_2I$, $CF_2=CFO(CF_2)_3-OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and mixtures thereof.

In one embodiment, the nitrogen-containing cure site group may comprise for example, an acetate, an adipate, a nitrile, an amidine, an imidate, an amidoxime, an amidrazone group, or combinations thereof.

Exemplary nitrogen-containing cure site group may be derived from: $CF_2$=$CF$—$CF_2$—$O$—$R_f$—$CN$, $CF_2$=$CFO(CF_2)_wCN$, $CF_2$=$CFO[CF_2CF(CF_3)O]_g(CF_2)_vOCF(CF_3)CN$, $CF_2$=$CF[OCF_2CF(CF_3)]_kO(CF_2)_uCN$, and mixtures thereof, wherein w represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples include perfluoro(8-cyano-5-methyl-3,6-dioxa-1-octene), $CF_2$=$CFO(CF_2)_5CN$, and $CF_2$=$CFO(CF_2)_3OCF(CF_3)CN$.

Alternatively, or in addition to cure site monomers, polymerization initiators and/or chain transfer agents may be used to produce terminal sites on the fluoropolymer, which may be used to subsequently crosslink the amorphous fluoropolymer.

In one embodiment, the amorphous fluoropolymer comprises at least 0.1, 0.5, 1, 2, or even 2.5 wt % of iodine, bromine, and/or nitrile groups versus the total weight of fluoropolymer. In one embodiment, the fluoropolymer comprises no more than 1, 2, 3, 5, or even 10 wt % of iodine, bromine, and/or nitrile groups versus the total weight of the fluoropolymer.

In another embodiment, the amorphous fluoropolymer is substantially free of iodine, bromine, and/or nitrile cure sites, meaning that the fluoropolymer comprises less than 0.1, 0.05, 0.01, or even 0.005 wt % or even no I, Br, and C≡N versus the weight of the amorphous fluoropolymer.

In one embodiment, the amorphous fluoropolymer is derived from interpolymerized monomers of the following: (i) a perfluorinated olefin (such as TFE and/or HFP); (ii) a perfluorovinyl ether monomer such as perfluoro(methyl vinyl ether) perfluoro(ethyl vinyl ether), perfluoro(propyl vinyl ether) and perfluoro(butyl vinyl ether) and/or a perfluoro(alkoxy vinyl ether) monomer such as $CF_2$=$CFO[CF_2CF(CF_3)O]_2CF_2CF_2CF_3$): and (ii) a structural unit derived from a monomer capable of giving a crosslinkable group (such as those comprising carboxyl (COOH) groups, alkoxycarbonyl (COOR) groups cyano (CN) groups, iodine atoms and bromide atoms. COOH groups, COOR groups and CN groups).

In one embodiment, the amorphous fluoropolymer is derived from interpolymerized monomers of the following: (i) 40 to 90% by mole of tetrafluoroethylene; (ii) 10 to 60% by mole of perfluorovinyl ether; and (iii) 0 to 5% by mole of a monomer giving a curing site. Such exemplary amorphous fluoropolymers include: 50 to 75% by mole of TFE, 25 to 50% by mole of PMVE, and 0.1 to 20% by mole of $CF_2$=$CFOCF_2CF(CF_3)OCF_2CF_2CN$; 50 to 75% by mole of TFE, 25 to 50% by mole of PMVE, and 0.1 to 20% by mole of $CF_2$=$CFOCF_2CF_2CF_2OCF(CF_3)CN$; 60 to 85% by mole of TFE, 15 to 40% by mole of $CF_2$=$CF(OCF_2CF(CF_3))_2OCF_2CF_2CF_3$, and 0.1 to 20% by mole of /$CF_2$=$CFOCF_2CF(CF_3)OCF_2CF_2CN$; 50 to 75% by mole of TFE, 25 to 50% by mole of PMVE, and 0.1 to 20% by mole of $CF_2$=$CFOCF_2CF(CF_3)OCF_2CF_2I$; 50 to 75% by mole of TFE, 25 to 50% by mole of PMVE, and 0.1 to 20% by mole of $CF_2$=$CFOCF_2CF_2CF_2OCF(CF_3)I$; and 60 to 85% by mole of TFE, 15 to 40% by mole of $CF_2$=$CF(OCF_2CF(CF_3))_2OCF_2CF_2CF_3$, and 0.1 to 20% by mole of /$CF_2$=$CFOCF_2CF(CF_3)OCF_2CF_2I$.

In one embodiment, the amorphous fluoropolymer is derived from interpolymerized monomers of the following: (i) 30 to 90% by mole of vinylidene fluoride, (ii) 15 to 40% by mole of hexafluoropropylene and (iii) 0 to 30% by mole of tetrafluoroethylene.

The metal fluoride particles may be introduced to the amorphous fluoropolymer while in a liquid phase or in a powder phase. For example, the metal fluoride particles may be added during compounding with the amorphous fluoropolymer, or they may be present during the polymerization of the amorphous fluoropolymer latex, or added to the amorphous fluoropolymer latex before coagulation.

The curable fluoropolymer composition of the present disclosure may be cured using compounds and techniques known in the art. A curing agent may be added to the curable fluoropolymer composition to cure the amorphous fluoropolymer into a fluoroelastomer. Such curing agents are known in the art and include, for example: a peroxide, a bisaminophenols such as bis ortho aminophenol, an adipates, an amidine, an acetate, a triazine-forming curing agent, (e.g., an onium, such as ammonium, phosphonium, sulfonium, or iodonium), or combinations thereof. In the instance of curing the amorphous fluoropolymer with a peroxide curing agent, the fluoropolymer comprises a Br, I and/or CN cure site and preferably the peroxide is an organic peroxide, such as a tertiary butyl peroxide having a tertiary carbon atom attached to peroxy oxygen.

Exemplary peroxides include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis (tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, 0,0'-1,3-propanediyl 00,00'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.), incorporated herein by reference.

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts by weight of the fluoropolymer.

Coagents are reactive additives used to improve the peroxide curing efficiency by rapidly reacting with radicals and potentially suppressing side reactions and/or generating additional crosslinks. The coagent forms a radical through hydrogen abstraction or addition of a radical from the peroxide, which can then react with the polymer through the Br, I, and/or nitrile sites. The coagents are multifunctional polyunsaturated compounds, which are known in the art and include allyl-containing cyanurates, isocyanurates, and phthalates, homopolymers of dienes, and co-polymers of dienes and vinyl aromatics. A wide variety of useful coagents are commercially available including di- and tri-allyl compounds, divinyl benzene, vinyl toluene, vinyl pyridine, 1,2-cis-polybutadiene and their derivatives. Exemplary coagents include a diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and mixtures thereof. Exemplary partially fluorinated compounds comprising two terminal unsaturation sites include:

$CH_2=CH-R_{f1}-CH=CH_2$ wherein $R_{f1}$ may be a perfluoroalkylene of 1 to 8 carbon atoms and a fluorine-containing TAIC such as those disclosed in U.S. Pat. No. 6,191,233 (Kishine et al.), incorporated herein by reference.

In one embodiment, the curable composition comprises the amorphous fluoropolymer, a peroxide and a coagent, wherein the amount of coagent used generally will be at least 0.1, 0.5, or even 1 part by weight per 100 parts by weight of the fluoropolymer; and at most 2, 2.5, 3, or even 5 parts by weight per 100 parts by weight of the fluoropolymer.

In the instance of curing the amorphous fluoropolymer with a polyhydroxy compound, typically the fluoropolymer comprises carbon-carbon double bonds and/or is capable of forming carbon-carbon double bonds along the polymer chain to form a fluoroelastomer. Polyhydroxy compounds for curing fluoropolymer are known in the art and include disclosed in U.S. Pat. No. 3,876,654 (Pattison), and U.S. Pat. No. 4,233,421 (Worm), which are both herein incorporated by reference. Representative examples include aromatic polyhydroxy compounds, preferably any one of the following: di-, tri-, and tetrahydroxybenzenes, and bisphenols. Exemplary aromatic polyhydroxy compounds include: 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A) or 4,4'(perfluoropropane-2,2-diyl)diphenol, dihydroxybenzophenone, hydroquinone, 2,4,6-trimercapto-S-triazine, 4,4'-thiodiphenol, and metal salts thereof.

Typically, at most 2, 2.5, 3, 4, 4.5, or even 5% weight of the polyhydroxy compound is used versus the amorphous fluoropolymer.

In one embodiment, the curable composition may comprise an organo onium compound to assist with the crosslinking of the amorphous fluoropolymer and/or may be used to generate the double bonds on the polymer through dehydrofluorination. Such organo onium compounds include quaternary ammonium hydroxides or salts, quaternary phosphonium hydroxides or salts, and ternary sulfonium hydroxides or salts.

Briefly, a phosphonium and ammonium salts or compounds comprise a central atom of phosphorous or nitrogen, respectively, covalently bonded to four organic moieties by means of a carbon-phosphorous (or carbon-nitrogen) covalent bonds and is ionically associated with an anion. The organic moieties can be the same or different.

Briefly, a sulfonium compound is a sulfur-containing organic compound in which at least one sulfur atom is covalently bonded to three organic moieties having from 1 to 2.0 carbon atoms by means of carbon-sulfur covalent bonds and is ionically associated with an anion. The organic moieties can be the same or different. The sulfonium compounds may have more than one relatively positive sulfur atom, e.g. $[(C_6H_5)_2S^+(CH_2)_4S^+(C_6H_5)_2]_2Cl^-$, and two of the carbon-sulfur covalent bonds may be between the carbon atoms of a divalent organic moiety, i.e. the sulfur atom may be a heteroatom in a cyclic structure.

Organo-onium compounds are known in the art, such as in U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), and U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed in U.S. Pat. No. 5,591,804 (Coggio, et al.).

Exemplary organo onium compounds include: $C_1$-$C_6$ symmetrical tetraalkylammonium salts, unsymmetrical tetraalkylammonium salts wherein the sum of alkyl carbons is between 8 and 24 and benzyltrialkylammonium salts wherein the sum of alkyl carbons is between 7 and 19 (for example tetrabutylammonium bromide, tetrabutylammonium chloride, benzyltributylammonium chloride, benzyltriethylammonium chloride, tetrabutylammonium hydrogen sulfate and tetrabutylammonium hydroxide, phenyltrimethylammonium chloride, tetrapentylammonium chloride, tetrapropylammonium bromide, tetrahexylammonium chloride, and tetraheptylammonium bromidetetramethlyammonium chloride); quaternary phosphonium salts, such as tetrabutylphosphonium salts, tetraphenylphosphonium chloride, benzyltriphenylphosphonium chloride, tributylallylphosphonium chloride, tributylbenzyl phosphonium chloride, tributyl-2-methoxypropylphosphonium chloride, benzyldiphenyl(dimethylamino)phosphonium chloride, 8-benzyl-1,8-diazobicyclo[5.4.0]7-undecenium chloride, benzyltris(dimethylamino)phosphonium chloride, and bis(benzyldiphenylphosphine)iminium chloride. Other suitable organo onium compounds include 1,8-diazabicyclo[5.4.0]undec-7-ene and 1,5-diazabicyclo[4.3.0]non-5-ene. Phenolate is a preferred anion for the quaternary ammonium and phosphonium salts.

In one embodiment, the organo onium compound is used from at least 1, 1.5, 2, or even 2.5 millimoles and at most 3.5, 4, 4.5 or even 5 millimoles per 100 parts (by weight in grams) of the amorphous fluoropolymer.

Also there are other known crosslinking systems, for example, a triazine crosslinking system for forming a triazine ring with an organotin compound by using a fluorine-containing elastomer having a nitrile group introduced as a crosslinking point (for example, JP58-152041A), an oxazol crosslinking system for forming an oxazol ring with bisaminophenol similarly by using a fluorine-containing elastomer having a nitrile group introduced as a crosslinking point (for example, JP59-109546A), an imidazole crosslinking system for forming an imidazole ring with a tetraamine compound (for example, JP59-109546A) and a thiazole crosslinking system for forming a thiazole ring with bisaminothiophenol (for example, JP8-104789A). Also methods of crosslinking with radiation or electron beam may be employed.

Particularly preferred crosslinking agents are compounds having plural 3-amino-4-hydroxyphenyl groups, 3 amino-mercaptophenyl groups or 3,4-diaminophenyl groups. Examples thereof are, for instance, 2,2-bis(3-amino-4-hydroxyphenyl)hexafluoropropane (generally called bis(aminophenol)AF) 2,2-bis-(3-amino-4-mercaptophenyl)hexafluoropropane, tetraaminobenzene, bis-3,4-diaminophenylmethane, bis-3,4-diaminophenylether, 2,2-bis(3,4-diaminophenyl)hexafluoropropane and the like.

Optional additives may be added to the curable fluoropolymer composition including, for example, stabilizers (e.g., antioxidants or UV- and light stabilizers), anti-microbials, pigments (e.g., dyes), flame retardants, medicaments, blowing agents, fillers, process aides, pigments, fillers, pore-forming agents, and the like. The use of such additives to improve physical properties, such as tensile strength, density, and modulus.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the cured product.

In one embodiment, the curable composition and/or cured product comprises less than 40, 30, 20, 15, 10, 5, 1, or even 0.1% by weight of the filler and/or optional additives.

Conventional adjuvants may also be incorporated into the curable composition of the present disclosure to enhance the properties in the resulting cured product. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from at least 1, 2, 4, or even 5%; and at most 10, 15, or even 20% weight per weight of the fluoropolymer.

In one embodiment, the curable composition comprises a strong organic base having a pKa of at least 10, or even at least 12, such as 1,8-bis-(dimethylamino) naphthalene, as disclosed in U.S. Pat. No. 4,983,680 (Ojakaar), herein incorporated by reference. In one embodiment, the strong organic base is used in an amount of at least 0.1, 0.2, or even 0.4 wt % to at most 0.6, 0.8, 1.0, 1.5, or even 2 wt % based on the amount of amorphous fluoropolymer.

In one embodiment, the curable compositions (and the resulting cured articles) are substantially free of acid acceptors, meaning that the curable composition (or resulting cured article) contains less than 0.5, 0.1, 0.05, 0.01% be weight per weight of the fluoropolymer, or even no acid acceptor.

The curable compositions comprising the amorphous fluoropolymer, and a plurality of metal fluoride particles can be prepared by mixing the above components using a typical rubber-processing machine such as an open roll, a Banbury mixer or a kneader. The composition can also be prepared by the method of using an internal mixer and the method of co-coagulating from the emulsion mixture and then compounding the mixture with the curing agents and/or additives.

This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluoropolymer "compound" or polymer sheets. The "compound" can then be extruded or pressed in a mold, e.g., a cavity or a transfer mold and subsequently be oven-cured. In an alternative embodiment, curing can be done in an autoclave.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds may first be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In one embodiment, the metal fluoride particles in the cured article are used in an amount of at least 5, 10, 15, 20, or even 25 pphr (parts per hundred rubber, by weight); at most 60, 50, 40, or even 30 pphr.

In one embodiment, the molded articles are treated by special cleaning methods as known in the art. For example, such cleaning methods include washing with ultrapure water, washing with a clean organic compound in the form of liquid at a certain temperature, washing with a clean aqueous inorganic solution, dry etch cleaning, or extraction cleaning. Such cleaning methods may be used to reduce the number of micro-particles and/or metal content.

The cured fluoropolymer articles disclosed herein are particularly suitable for various parts for semiconductor production apparatuses. In the present invention, the semiconductor production apparatuses are not limited particularly to apparatuses for producing semiconductors and encompass whole manufacturing equipment used in the field of semiconductors where a high degree of cleanliness is required, such as equipment for manufacturing a liquid crystal panel and plasma panel.

Particularly the fluorine-containing elastomer molded article can be suitably used for production of sealing materials for sealing of semiconductor production apparatuses which are required to have high cleanliness. Examples of the sealing material are O-ring, square ring, quick-connect seals, gasket, packing, oil seal, bearing seal, lip seal, etc.

Because of the stringent requirements related to using fluoroelastomers in the semiconductor industry. Various test methods have been developed to predict whether or not the fluoroelastomer article is suitable for use, including chemical stability.

One such test method is related to weight loss, where the fluoroelastomer article is exposed to the plasma and the loss of weight is determined. In one embodiment, the fluoroelastomer shows a weight loss percentage after oxygen plasma exposure of less than 3.0, 2.0, or even 1.0. In one embodiment, the fluoroelastomer shows a weight loss percentage after carbon tetrafluoride and oxygen plasma exposure of less than 3.0, 2.0, or even 1.0.

In one embodiment, there is no discoloration of the fluoroelastomer after plasma treatment, meaning that after plasma treatment, there is no apparent change is color between the fluoroelastomer before treatment and after treatment when viewed visually by the unaided eye.

In one embodiment, the fluoroelastomer shows less than 3, 2, 1, or even 0.5% swelling when exposed to 80° C. water for 168 hours. In one embodiment, the fluoroelastomer shows less than 3, 2, or even 1.5% swelling when exposed to 200° C. water for 168 hours.

EXAMPLES

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

All materials are commercially available, for example from Sigma-Aldrich Chemical Company, Milwaukee, WI, USA, or known to those skilled in the art, unless otherwise stated or apparent.

The following abbreviations are used in this section: mL=milliliters, g=grams, in=inches, cm=centimeters, μm=micrometers, nm=nanometers, min=minutes, h=hours, r.t.=room temperature, ° C.=degrees Celsius, phr=parts per hundred rubber, sccm=standard cubic centimeters, mTorr=milliTorr. Abbreviations for materials used in this section, as well as descriptions of the materials, are provided in Table 1.

TABLE 1

| Material | Details |
|---|---|
| FFKM | A perfluoroelastomer is derived from about 49.2% of TFE, 50.3% of PMVE and 0.5% of $CF_2 = CFO(CF_2)_3O(CF_2)_2I$ by weight, 72.2% fluorine content by weight, 0.31% iodine content by weight and Mooney Viscosity ML1 + 10 @ 121° C. of 40. |
| $Yb_2O_3$ | 99.9% pure, Average Particle Size: 3 μm, * Strem Chemicals, Inc., Newburyport, MA |
| $YbF_3$ | 99.9% pure, average Particle Size: 5 μm, * Strem Chemicals, Inc. |
| MgO | 99.9% pure, average Primary Particle Size: 80 nm, Fujifilm Wako Pure Chemical Corporation, Cape Charles, VA |
| $MgF_2$ | AID L30, Average Primary Particle Size: 20 nm, Stella Chemifa Singapore Pte Ltd, Singapore |
| $ZrF_4$ | 98% pure, Average Particle Size 8 μm*, Strem Chemicals, Inc. |
| $SiO_2$ Latex | 40% solid % of $SiO_2$ (Average Primary Particle Size: 20 nm), Nalco Holding Company, Naperville, IL |
| $AlF_3$ | Average Particle Size: 85 μm, * Fujifilm Wako Pure Chemical Cooperation |
| TAIC | Triallyl isocyanurate, Mitsubishi Chemical Holdings Corporation, Tokyo, Japan |
| DBPH | 2,5-(dimethyl-2,5-di(t-butylperoxy)-hexane), available under the trade designation "PERHEXA 25B" from NOF Corporation, Tokyo, Japan |

Average Particle Size

The average particle size marked by a "*" in Table 1 was obtained by dispersing the obtained particles in a 0.2% sodium hexametaphosphate aqueous solution. The particle size was measured using a laser scattering particle size distribution analyzer (partica LA-950V2 available from Horiba Ltd., Kyoto, Japan). The average particle sizes not marked were taken from the supplier.

Compounding

Powder Blend (CE-2 to CE-5 and EX-1 to EX-3)

Perfluoroelastomer (FFKM), fillers (fluorides or oxides), 2 phr of TAIC and 1.25 phr of DBPH were mixed on a 6 in (15.24 cm) open roll mill.

Latex Blend (CE-1 $SiO_2$ Latex)

Perfluoroelastomer latex (FFKM Latex) and $SiO_2$ latex were mixed in a plastic cup and the mixture was placed at −40° C. for 16 h. The cold mixture was placed at room temperature for 4 h. Then the solids were filtered out of the water with cheese cloth, squeezed gently, and returned to deionized water. This mixture was then stirred to rinse the material and the solid filtering and rinsing procedure was repeated. The final recovered solids were placed in a batch oven at 130° C. for 16 h.

The dried materials, 2 phr of TAIC and 1.25 phr of DBPH were mixed with 6 in (15.24 cm) open roll mill.

Molded O-Rings

They were molded to o-rings (AS568 standard, AS 568-214) at 177° C. for 12 min. Then they were post cured at 200° C. for 16 h. Press-cured and post-cured o-rings were tested for plasma resistance and water swelling as described below. The results are presented in Table 3 and Table 4, below.

Plasma Resistance

Samples were tested in a Mini-Lab Plasma Pod, available from JLS Designs Ltd, Somerset, UK, with exposure to two different plasma conditions: (1) $O_2$ Plasma: 30 sccm, 100 W, 225 mTorr, (2) $CF_4/O_2$ Plasma: 3 sccm ($CF_4$), 27 sccm ($O_2$), 100 W, 225 mTorr. ¼ size of O-rings were weighed in a balance. They were placed on the pod of the plasma tester. They were exposed by Plasma gas for 3 h. Then they were weighed in a balance again and the weight loss % was calculated according to the following equation:

$$\text{Weight Loss (\%)} = \frac{\left(\begin{array}{c}\text{Initial Weight (g)} - \\ \text{Weight (g) after Plasma Exposure}\end{array}\right)}{\text{Initial Weight (g)}} \times 100$$

The results presented in Table 2 represent averages for three replicates of each sample.

TABLE 2

| | CE-1 | CE-2 | EX-1 | CE-3 | EX-2 |
|---|---|---|---|---|---|
| Fillers | $SiO_2$ | $Yb_2O_3$ | $YbF_3$ | MgO | $MgF_2$ |
| Filler % by XRF analysis | 10.0% | 11.2% | 11.0% | 8.4% | 8.9% |
| After treatment with $O_2$ plasma | | | | | |
| Weight Loss % | 1.44 | 3.42 | 2.82 | 1.40 | 0.86 |
| Visual color change from initial | | No discoloration | | | |
| After treatment with $CF_4/O_2$ plasma | | | | | |
| Weight Loss % | 4.02 | 3.21 | 2.58 | 0.88 | 0.71 |
| Visual color change from initial | | No discoloration | | | |

Water Swelling

Samples were placed in a wide mouth glass jar for 80° C. test or pressure resistant stainless tube for 200° C. test. ½ size of D-214 O-rings were weighed in a balance. They were put into wide mouth glass jar for testing at 80° C. or a pressure resistant stainless tube for testing at 200° C. The caps were closed and placed in an oven at 80° C. or 200° C., as indicated in Table 3, for 168 h. They were taken out and weighed by a balance again and the swelled % was calculated by the following equation:

$$\text{Swelled (\%)} = \frac{\left(\begin{array}{c}\text{Weight after water resistivity test (g)} - \\ \text{Initial Weight(g)}\end{array}\right)}{\text{Initial Weight (g)}} \times 100$$

Then samples were dried in an oven at 120° C. for 16 h. They were taken out and weighed by a balance again and the change % was calculated by the following equation:

$$\text{Change (\%)} = \frac{(\text{Weight after drying (g)} - \text{Initial Weight(g)})}{\text{Initial Weight (g)}} \times 100$$

TABLE 3

|  |  | CE-4 | CE-5 | EX-3 |
|---|---|---|---|---|
| FFKM |  | 100 | 100 | 100 |
| TAIC |  | 2 | 2 | 2 |
| DBPH neat |  | 1.25 | 1.25 | 1.25 |
| $ZrF_4$ |  | 10 |  |  |
| $AlF_3$ |  |  | 10 |  |
| $MgF_2$ |  |  |  | 10 |
| Swelling |  |  |  |  |
| 80° C., 168 h in water | Swelled % | 3.90 | 0.58 | 0.42 |
|  | Change % | −0.27 | −0.06 | −0.12 |
| 200° C., 168 h in water | Swelled % | 1.93 | 3.87 | 1.15 |
|  | Change % | −2.00 | −0.06 | −0.37 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A curable fluoropolymer composition comprising:
   an amorphous fluoropolymer, wherein the amorphous fluoropolymer comprises at least one of an iodine-, a bromine- and a nitrogen-containing cure site group; and
   particles of a metal fluoride, wherein the particles comprise less than 10% by weight of organic moieties on the particles' surface and wherein the metal of the metal fluoride comprises at least one of an alkaline earth metal, a Group III transition metals, and a Lanthanide metals.

2. The curable fluoropolymer composition of claim 1, wherein the metal fluoride has a solubility in water at 20° C. and ambient pressures of less than 0.5 g/100 g.

3. The curable fluoropolymer composition of claim 1, wherein the metal of the metal fluoride comprises at least one of group consisting of Ca, Mg, Y, and Yb.

4. The curable fluoropolymer composition of claim 1, wherein the particles of a metal fluoride have an average diameter of less than 1 mm.

5. The curable fluoropolymer composition of claim 1, wherein the particles of a metal fluoride have an average diameter of less than 500 nm.

6. The curable fluoropolymer composition of claim 1, comprising at least 0.1% and at most 30 wt % of the particles of metal fluoride.

7. The curable fluoropolymer composition of claim 1, wherein the amorphous fluoropolymer is derived from a monomer selected from at least one of a tetrafluoroethylene, hexafluoropropylene, vinylidene fluoride, propylene, perfluoropropyl vinyl ether, $CF_2$=CF—O—$CF_2$—O—$CF_3$, $CF_2$=CF—O—$CF_2$—O—$CF_2CF_3$, $CH_2$=CF—$CF_3$, perfluoromethylvinyl ether, 3-methoxy perfluoropropylvinyl ether, $CF_2$CF—O—$CF_2$—O—$CF_2CF_2CF_3$, and $CF_2$CF—O—$CF_2$—O—$CF_2CF_2CF_2$—O—$C_3F_7$.

8. The curable fluoropolymer composition of claim 1, wherein the nitrogen-containing cure site is selected from at least one of a nitrile, an imidate, an amidoxime, and an amidrazone.

9. The curable fluoropolymer composition of claim 1, wherein the metal of the metal fluoride comprises at least one of an alkaline earth metal, and a Group III transition metals.

10. The curable fluoropolymer composition of claim 1, wherein the amorphous fluoropolymer is perfluorinated.

11. The curable fluoropolymer composition of claim 10, wherein the amorphous fluoropolymer is derived from at least one of a perfluorinated olefin and a perfluorinated vinyl ether.

12. The curable fluoropolymer composition of claim 1, further comprising a curing agent.

13. The curable fluoropolymer composition of claim 12, wherein the curing agent is at least one of: a peroxide, bisaminophenols, a triazine-forming curing agent, and an onium.

14. A method of making an article comprising: providing a curable fluoropolymer composition of claim 1; and then curing the composition.

15. A cured article comprising:
   a fluoroelastomer, wherein the fluoroelastomer comprises at least one of an iodine-, a bromine- and a nitrogen-containing cure site group; and
   particles of a metal fluoride, wherein the particles comprise less than 10% by weight of organic moieties on the particles' surface and wherein the metal of the metal fluoride comprises at least one of an alkaline earth metal, a Group III transition metal particles, and a Lanthanide.

16. The cured article of claim 15, wherein the fluoroelastomer is perfluorinated.

17. The cured article of claim 15, wherein the metal fluoride has a solubility in water at 20° C. and ambient pressures of less than 0.5 g/100 g.

18. The cured article of claim 15, wherein the metal of the metal fluoride comprises at least one of group consisting of Ca, Mg, Y, and Yb.

19. The cured article of claim 15, wherein the particles of a metal fluoride have an average diameter of less than 1 mm.

20. The cured article of claim 15, wherein the cured article comprises at least 0.1% and at most 30 wt % of the particles of metal fluoride.

* * * * *